US005648648A

United States Patent [19]

Chou et al.

[11] Patent Number: 5,648,648

[45] Date of Patent: Jul. 15, 1997

[54] PERSONAL IDENTIFICATION SYSTEM FOR USE WITH FINGERPRINT DATA IN SECURED TRANSACTIONS

[75] Inventors: Ken W. Chou, Glendora; Ruey-Long Tang, Hacienda Heights, both of Calif.

[73] Assignee: Finger Power, Inc., Rosemead, Calif.

[21] Appl. No.: 596,570

[22] Filed: Feb. 5, 1996

[51] Int. Cl.[6] .......... G06K 5/00

[52] U.S. Cl. .......... 235/382; 235/379; 235/380

[58] Field of Search .......... 235/379, 380, 235/382

[56] References Cited

U.S. PATENT DOCUMENTS 5,509,083 4/1996 Abtahi et al. .......... 235/380
5,513,272 4/1996 Bogosian .......... 235/382

*Primary Examiner*—Harold Pitts

[57] ABSTRACT

A personal identification system for use with fingerprint data in security sensitive transactions is disclosed. The systems performs according to the following steps: generating an access file for specifying a plurality of different comparison ratio ("CR") levels with each level corresponding to an acceptable transaction; receiving the requester fingerprint data and its accompanying request parameters; comparing the requester fingerprint data with one of a plurality of fingerprint data in a master file corresponding to the account upon which a transaction is requested; generating an AR/RR based on result of comparison; evaluating the request for transaction and the AR/RR using the access file; if the AR/RR is acceptable for the requested transaction, granting the request after successfully passing additional authentication tests, and if the AR/RR is not acceptable for the transaction, entering at least one exception routine for additional authentication.

10 Claims, 3 Drawing Sheets

Example: Setup Screen

For Registration Purpose:
Pre-setup rules and tables for quick user setup base on different criteria.

PERSONAL IDENTIFICATION SYSTEM FOR USE WITH FINGERPRINT DATA IN SECURED TRANSACTIONS

FIELD OF INVENTION

The present invention relates to personal identification systems and more particularly relates to those systems authenticating users through fingerprint image recognition to facilitate secured transactions.

BACKGROUND OF THE INVENTION

With the proliferation of the automated interactive machines, exemplified by the automated teller machines (ATM) for financial transactions, there has been an emerging need for a more reliable personal identification system for authenticating users who desire to conduct transactions remotely and automatically without human intervention. Conventionally, a person simply inserts her ATM card into the machine to have her account information and password, or PIN ("Personal Identification Number", used here interchangeably with the word "Password"), read. However, as the everyday life as a whole becomes more automated and security-conscious, a person often has to manage various different passwords and PIN's, for accesses to her banking account, her home security system, or her eMail account, to name just a few. This overflow of information has already contributed to the complexity of conventional personal identification systems in that without the correct password for an ATM, a legitimate user may be denied of her access to her account or her on-line brokerage account.

There is an often overlooked burden placed on the institutions providing on-line, or remote, transactions which are accessed through the customers' passwords or PINs. Maintaining the passwords or PINs forces the financial institutions to allocate additional machines and human resources to manage interface with customers when a customer forgets her Pin or when a customer requests her PIN be changed.

Also, passwords have been proven to be insufficient in preventing fraud, where all a would-be criminal needs is an ATM card and the password, which are both reasonably within the reach of those unscrupulous ones. This is just the first example of how the conventional personal identification paradigm is vulnerable, in addition to being complex as discussed above.

Another problem plagues the integrity of the supposedly secured financial transaction, where sometimes it is the actual account holder who defrauds the institution by first accessing her account and later denying such transaction from ever taking place. While there is a limit as to the extent of this sort of heinous behavior, it amounts to a significant sum even with just a small percentage of the ATM transactions considered. Without a more reliable identification system, institutions will just have to write off the losses or pass the losses to the rest of the consumers, thereby increasing everyone's cost of doing business.

Aside from the ATM transactions, with the increasing affordability, as well as sophistication, of personal computers and telecommunication hardware and software, it is more likely that one will soon be accessing a host of information or conducting a variety Of secured transactions using a PC, a modem and a common public switching network, such as Prodigy and Internet, etc. Authentication thus becomes an even more paramount task for the industry to tackle.

A simple personal identification system may address the above problems. Fingerprints have been known years ago to have a high degree of accuracy and reliability. One never forgets her fingerprints, or confuses the fingerprints with other information. Also, a criminal cannot steal or duplicate someone's fingerprints to impersonate the account holder, generally speaking. Therefore, fingerprints are essentially a personal identification with a one-to-one correspondence, given that the fingerprint recognition systems have progressed along with the information revolution. Companies such as Identix and Startech have developed front-end fingerprint image recognition systems to reliably and accurately analyze and recognize fingerprints.

At the back-end, major processor suppliers such as IBM and AT&T already have systems in place to provide a linkup with the fingerprint image recognition systems such that the massive fingerprint database may be linked and accessed for the institution to quickly authenticate the person in front of its machine, or the person seeking to access her brokerage account through a PC with a modem. To a certain extent, the present front-end and back-end suppliers have reached a point, where it is merely a matter of time before their capabilities and achievements can be fully utilized by the industry, especially the financial industry.

Even with reliable fingerprint image recognition systems at the front-end and quick-response processor at the back-end, there are still problems with this paradigm. Assuming it is reasonably affordable for a PC owner to have a personal fingerprint recognition device to provide access to her on-line brokerage account at a brokerage firm with a processor to facilitate authentication, there is still about 1% error rate, generally characterized by false rejection of legitimate users, due to the inherent imperfection of one's fingerprints. For example, if a person regularly works with abrasive chemicals, the quality of her fingerprints tends to deteriorate throughout the years. The degraded quality of the fingerprints, when faced with a security sensitive system as in most security-sensitive transactions, will certainly add to the agony of the users, thus further eroding the public's confidence toward the integrity of future systems.

On the other hand, if the security sensitivity is forced to be compromised to minimize false "rejection", then the error rate of false "acceptance" may increase and vice versa. Conversely, if the security sensitivity is forced to be compromised to minimize false "acceptance," then the error rate of false "rejection" may increase. Now that a half-way decent "match" will allow access erroneously. This is also not something which will contribute to the public's confidence toward fingerprint-based personal identification systems. Nor will it contribute to the industry whose primary application of the fingerprint-based personal identification systems is to protect their business and financial interests.

Furthermore, the creation of an initial file, i.e., when the account holder first sets up her account with her fingerprints at the institution's facility, may not be perfectly analyzed and stored as file data. The possibility of having less than perfect fingerprints on file makes the occurrence of false rejection/acceptance even more likely. For example, if the initial registration has a 90% accuracy, it would always be a 90% accuracy. It would still be a 90% match at best, even with a 100% accurate reading at the ATM at a later time. In other words, both ends of the overall system may contribute to the unreliability of the system.

Therefore, it is desirable to have a personal identification system for use with fingerprint recognition front-ends to raise the percentage of accuracy, thus minimizing the security risks in connection with secured transactions.

It is also desirable to have a personal identification system for taking advantages of the conventional fingerprint recognition devices to provide a flexible solution in light of the various vendors of the front-end and back-end systems.

It is further desirable to have a fingerprint-based personal identification system which will provide an easy-to-use solution to the security issues involved in accessing the information superhighway.

Summary of the Invention

A personal identification system for use with fingerprint data in security sensitive transactions is disclosed. The systems performs according to the following steps: generating an access file for specifying a plurality of different comparison ratio ("CR") levels with each level corresponding to an acceptable transaction; receiving the requester fingerprint data and its accompanying request parameters; comparing the requester fingerprint data with one of a plurality of fingerprint data in a master file corresponding to the account upon which a transaction is requested; generating an AR/RR based on result of comparison; evaluating the request for transaction and the AR/RR, using the access file; if the AR/RR is acceptable for the requested transaction, granting the request after successfully passing additional authentication tests, and if the AR/RR is not acceptable for the transaction, entering at least one exception routine for additional authentication.

BRIEF DESCRIPTION OF THE DRAWINGS

Additional objects, features And advantages of the present invention will become apparent to those skilled in the art from the description which follows, wherein.

DETAILED DESCRIPTION OF THE PREFERRED EMBODIMENT

A personal identification system for use with fingerprint recognition devices is disclosed. In the following description, the present invention is disclosed in terms of process flows and functional block diagrams, which are the terms readily understood by those skilled in the art. They are also the means for those skilled in the art to communicate among themselves. It is not limited to any particularly coding language; nor is it limited to any particular implementation methodology, hardware devices, operating system and operating environment. Furthermore, it should be understood by those skilled in the art that financial transactions is only one example of the security sensitive transactions for which the present invention may be used. As will be understood, the present invention may be used in any environment or transaction where authentication of the users for access is an issue.

Figure 1:
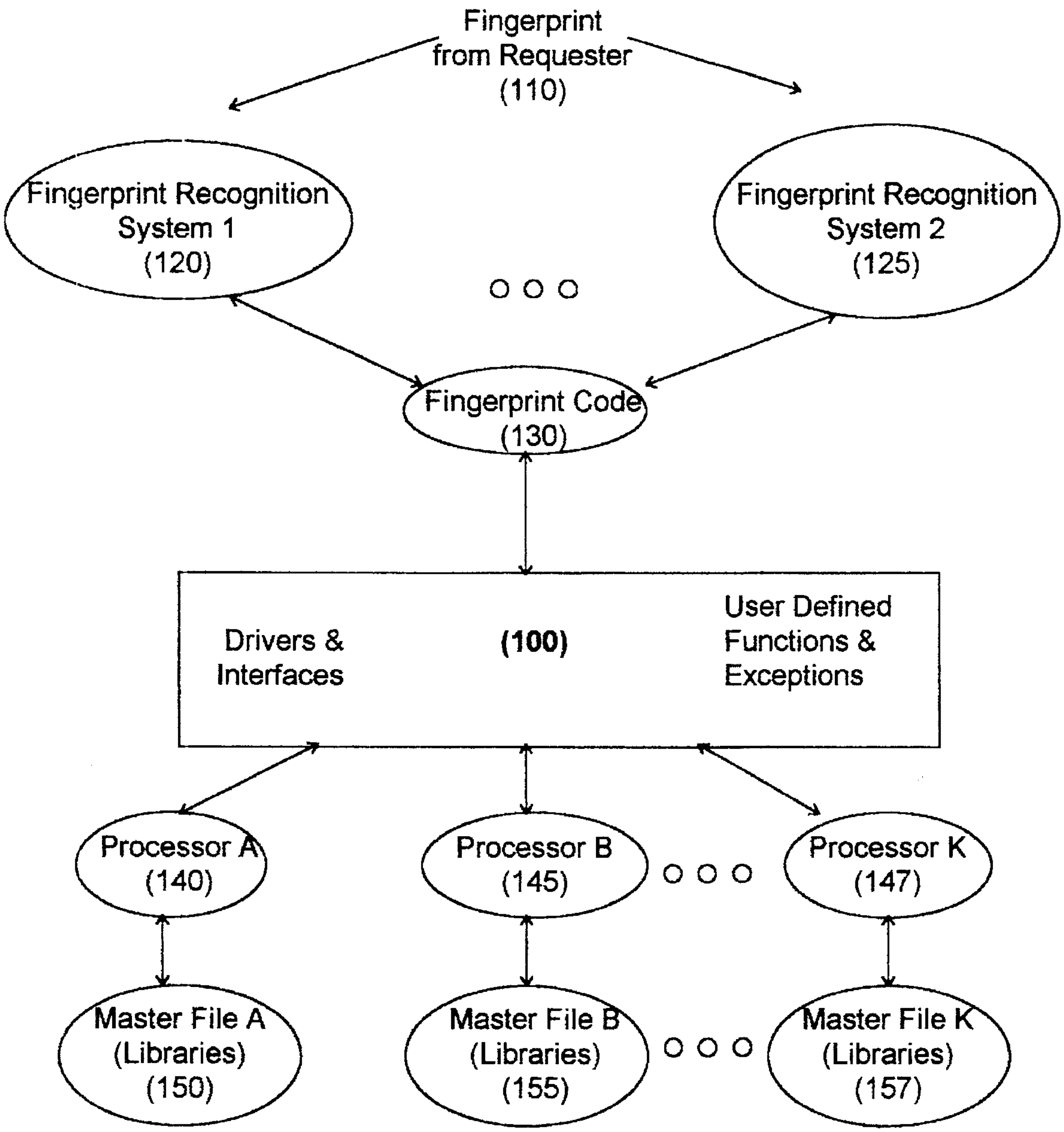
FIG. 1 illustrates a simplified high-level block diagram of the present invention.

Reference is to FIG. 1, where a simplified high-level block diagram of the present invention (100) as it relates to its operating environment is shown. At the front-end, when a requester's fingerprints (110) are received by an input device (120), such as a typical fingerprint recognition device, equipped on the ATM, they are analyzed, recognized and generated as fingerprint data (130) in a predefined front-end data format. Another fingerprint recognition device (125) from a different vendor, may generate a different fingerprint data format (130). This scenario is representative of one where there are many front-ends vendors of fingerprint recognition systems producing different fingerprint data based on their predefined formats. While the industry standards are not established and harmonized, each processing system accepting different fingerprint data must convert the non-conforming fingerprint data into one that is useful and acceptable for storing and processing by the back-end processor system. In this present invention (100), interface drivers are provided, one for each different input format generated by various fingerprint recognition systems. Also, user defined functions are provided to allow the institutions to customize their individual authentication process.

It should be noted, however, that there are established methods by which fingerprints are analyzed and recognized. As suck the present invention is not dependent upon any particular fingerprint recognition system as will be further described below.

At the back-end, there is a processing unit (140), associated with libraries of master files (150) for storing fingerprint data. What has happened conventionally is that the fingerprint data (130) from the front-end will be compared with the fingerprint data stored in the master file and libraries (150) to authenticate a requester based on some predefined comparison criteria. Note that master files generally refer to stored information about the institution's account, while libraries generally refer to executable routines and procedures, which are accessed and maintained by the institutions. For example, an institution may link input devices from vendor (120) to processor (140). Thus, the typical preliminary task would be to ensure that the two ends can communicate efficiently and effectively through established protocols. Also, a fingerprint recognition system (125) from a different vendor may be substituted in the future, as long as the generated fingerprint data are compatible or convertible to the ones stored in the master file and libraries (150).

Assuming communication between the front-end and the back-end are properly established, the present invention will provide an intermediate link (100) between the two ends which will integrate all dissimilar front-end devices and data into one acceptable and recognizable data format, and with its built-in levels of AR/RR logic and exceptions processing capability, the present invention leads the overall personal identification methodology more foolproof and efficient, thus reducing the inherent error rate of 1% to a minute level that is acceptable to the institutions.

Figure 2:
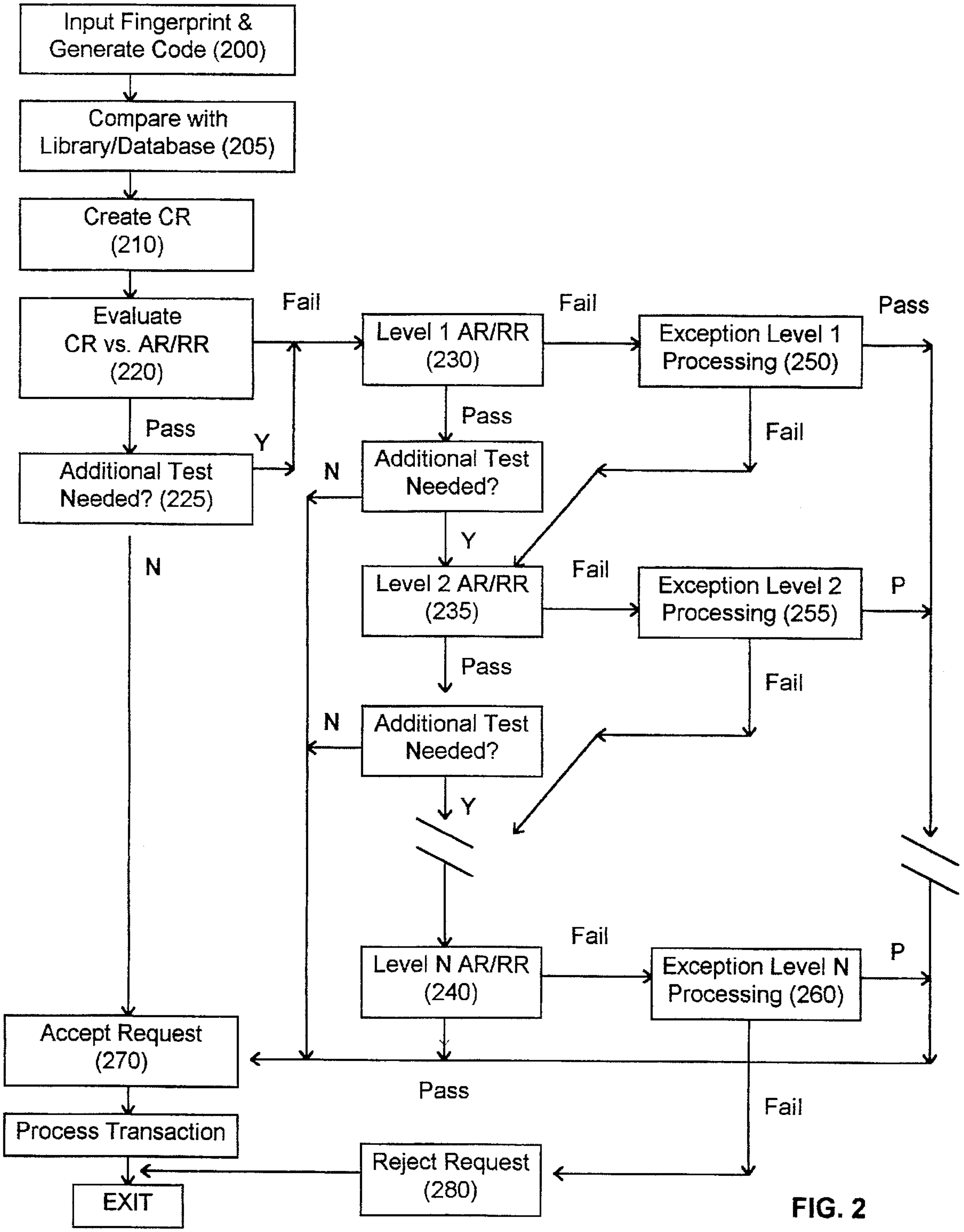
FIG. 2 illustrates a process flow of the present invention.

Reference is to FIG. 2, where a process flow of the present invention is shown. When an access request is received with a set of fingerprints (FIG. 1, 130), the fingerprints are analyzed and recognized, and subsequently used to generate fingerprint data (200). The received fingerprint data are then compared (205) with a target master file data to generate (210) a comparison ratio (CR). Note that a CR may be achieved based on how the fingerprint data compare with a target fingerprint data on the master file, which corresponds to the provided information, e.g., account number, under the predefined criteria, as will be appreciated by those skilled in the art. It should also be noted that those skilled in the art can readily define how to characterize the result of a comparison, e.g., a 50% match or a 95% match.

The target master file data (205) may comprise a table of individualized AR/RR ratio table, fingerprint data and exception conditions. The individualized ratio table can allow the institution, or user of the present invention, to have an AR or a rejection ratio ("CRR") based on the account holder's fingerprint readability. For example, an account user have poor quality fingerprint such that a lower individualized CR may be desired just for that user.

In either cases of rejection or acceptance procedures, multiple levels may be implemented and maintained to provide additional authentication for either case of testing for false rejection and false acceptance.

Once the CR is determined, e.g., 80% or 95%, its accompanying access request (220) is evaluated against a multi-level criteria based on criticality and significance thresholds. If the CR meets the minimum requirements, the evaluation continues. To reduce the risk of false acceptance, an institution is also provided with the option to implement and maintain additional tests (225) internally (such as comparing an additional set of criteria established specifically for an account), or externally requesting for additional information through the screen, or user interface. The additional information may be verifying the user's mother's maiden name or verifying additional password. The evaluation is said to be successful when it passes the lowest level of criteria threshold. For example, if a requester's CR is 70% and the request is for withdrawing $30,000, then such a request may be granted, or rejected, provided that the account holder has initially allowed such transaction for such an AR/RR level. The institution may even place a higher CR requirement for any amount over $2,000 such that a withdrawal for $30,000 with an CR of only 70% will be denied. Again, note that the institution, when setting up its authentication system utilizing the present invention, may provide a plethora of options and exceptions with the multi-level criteria concept.

Different types of transactions require different levels of evaluation criteria thresholds. For example, a request to check an account balance does not require a 90% CR and may be set to a lower CR threshold by the account holder when setting up her account portfolio, if such feature is provided by the institution. As can be appreciated by those skilled in the art, this flexibility drastically reduces the chance of false rejection, and the requester antagonism is kept to a minimum. Note that the different criteria may be maintained and stored in the table as indicated above (205).

Further supplement to the personal identification system of the present invention, automated exception processing is provided for institutions to intervene a requested access. Standard rules are blanket conditions established (institution defined) for the multiple levels (230, 235, 240). Exceptions, as well known to the software community, are sets of specific rules not defined in the standard rules. Exception rules may be blanket exceptions discriminating for or against a class of status, e.g., financial, social, geographic, ethnic, etc. Or they may be specific exceptions discriminating for or against an event (e.g., a certain day/time and occasion), or an individual, business or personal (e.g., a person with a specific financial status or criminal record). Exception processing (250) for the lowest level of CR (230) may be to automatically verify all exception criteria associated with that level for a request when it fails to pass a certain level of the AR test; or it may automatically verify against a request when it successfully passes an AR level test.

Another exception (255) may be to require a supplemental access code to further authenticate the requester when the CR is lower than the required AR, or when the CR is higher than the RR for the requester. For example, instead of denying a request when the CR is lower than the standard AR requirements due to an imperfect input device, the requester may be asked to enter additional information such as mother's maiden name to still gain access to the ATM.

A CR which passes an AR may be set to "pass" the test, or it may be set to perform additional exceptions tests, which are specific to the requester. A CR which falls an AR test may be tested for a pre-established RR.

If the CR falls below the RR, the requester may be rejected, or it may be set to perform additional exceptions tests specific to the requester.

If the CR fails the AR but passes the RR, the CR may be further evaluated for blanket exceptions to determine its qualification.

As a last resort in an attempt to satisfy a request, as well as to lower the AR/RR error rate after all automated exception processing steps have been exhausted, a requester may be directed by an exception processing routine (260) to go to a near-by service location, e.g., a branch, to let an authorized representative to manually and visually authenticate the request.

As can be understood by those skilled in the art, there exist multiple levels of accesses (230, 235, 240), with any combination of AR/RR rules, as well as multiple exception processing (250, 255, 260), to minimize false identification due to the inherent defective fingerprint data. Further, the present invention allows a service provider institution, e.g., a bank or a brokerage house, to determine how to set up and customize its rules and processing procedures for acceptance and rejection. These rules and procedures, both standard and exceptions, may be specified by an institution during the set-up phase of practicing the present invention. The rules and procedures may be maintained by an institution through proper authorization.

Figure 3:
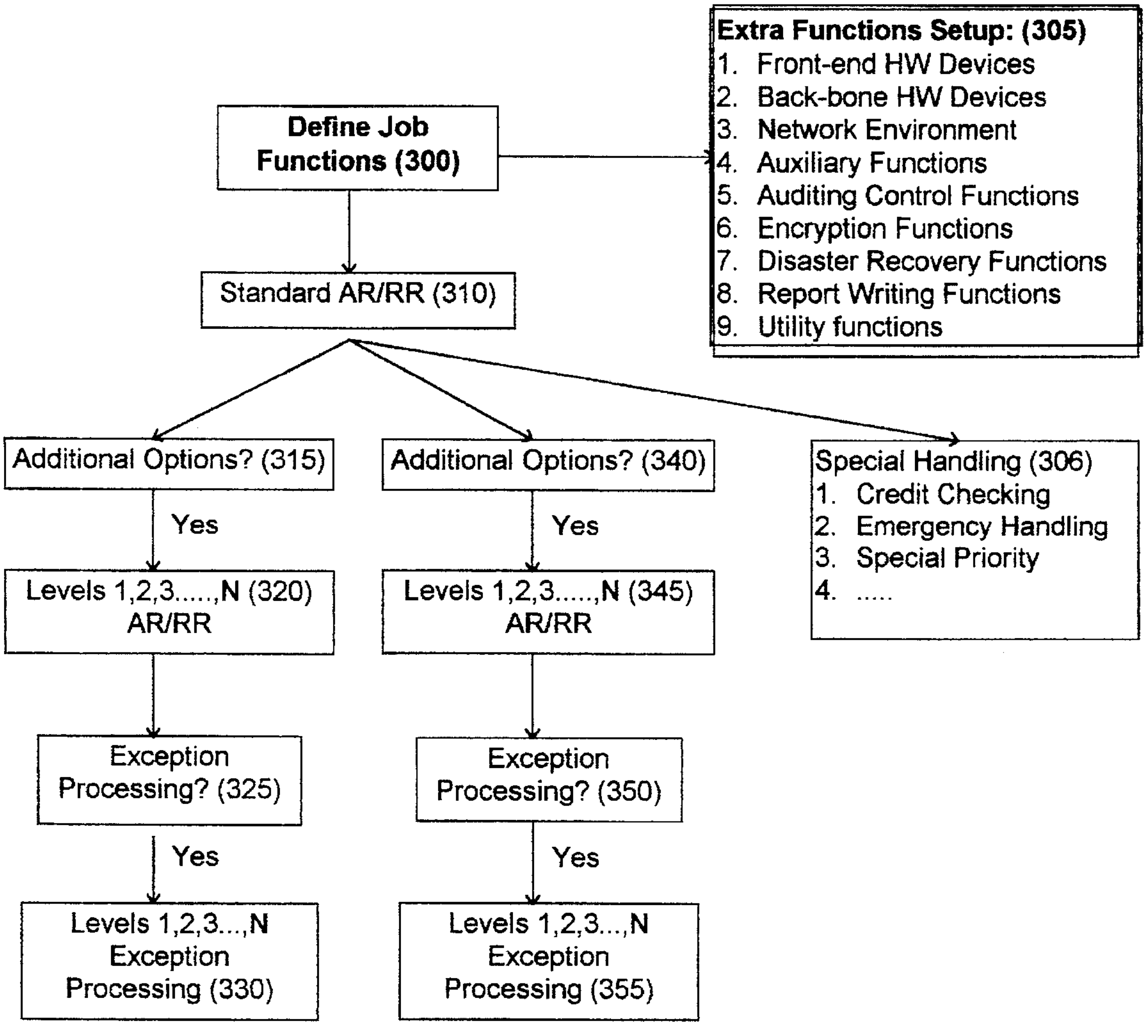
FIG. 3 illustrates one embodiment of the "setup screen" in accordance with the present invention.

FIG. 3 illustrates a "setup screen" encountered by an institution in accordance with the present invention. When setting up an account portfolio, various job functions can be defined in block 300. Also, additional functions can be defined in block 305. For example, front-end hardware device; back-bone hardware device; network environment; auxiliary functions; auditing control functions; encryption functions; disaster recovery functions; report writing functions; and utility functions.

In block 310, the institution may define its standard AR/RR processing and criteria. An option of additional processing can also be set up in blocks 315, 340. For example, block 315 may be used to define additional acceptance processing and block 340 may be used to define rejections processing. These additional options may be setting multiple levels of AR/RR and their corresponding exception processing (320, 345, 325, 350, 330, 355). Even with standard AR/RR 310, an institution may specify special handing (306), which may include credit checking, emergency or panic handling and special priority granting.

Implementation Considerations of the Present Invention

The personal identification system in accordance with the present invention may be approached from a software perspective. It may interface and control its hardware and firmware through a PC, EEPROM, and/or CMOS, or any combination thereof. The system and its methodology are of a multi-level, multi- dimensional design, while remaining versatile, flexible and reliable. With software to supplement the control of hardware, the conventional error rate can be minimized.

The present invention is also device independent in nature when it is built-in with various device drivers to interface with the various dissimilar devices, and various system interface drivers to interface various operating systems. The customization of the rules and procedures are menu-driven with script capability. For example, different institutions may have different ways of handling exceptions conditions. Or they may desire to customize the multi-level structure based on their own human and machine resources. All these may be accomplished through the use of menus and script facility.

Other implementation considerations may be as follows:

1. Device Independent
2. Multi-level Pull-down Menus
3. Exits for exceptions processing
4. Network Control
5. Built-in Audit Control
6. Built-in Internal Security Violation control
7. Data encryption/decryption
8. Disaster recovery measurement and procedures (Optional)
9. Report-writing Capability
10. Utility programs for fingerprint rematching and file maintenance, etc.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents in that a nail employs a cylindrical surface, in the environment of fastening wooden parts, a nail and a screw may be equivalent structures.

We claim:

1. In a transaction-based system for conducting secured-data transactions, comprising:

at least one fingerprint recognition device for recognizing and generating fingerprint data of a requester in a predefined format, master files and libraries for initially storing a plurality of fingerprint data corresponding to a plurality of users of said system, and a data processing unit coupled to said master files and libraries for maintaining preestablished criteria maintained in said master files and libraries for said request by comparing said fingerprint data from said requester with a corresponding entry in said master file and libraries using said predetermined criteria, a method of personal identification for said system to conduct secured-data transactions using said fingerprint data of said requester, comprising the steps of:

a) generating and maintaining, for each account, an access file for specifying a plurality of different AR/RR levels with each level corresponding to an acceptable transaction such that a transaction is allowed when an AR level is met, or rejected when it falls below an RR level;

b) receiving fingerprint data of a requester and its accompanying request for a transaction and account information;

c) generating a CR for said requester's fingerprint data;

d) comparing said fingerprint data of said requester with one of said plurality of fingerprint data in said master file pertaining to said account;

e) evaluating said CR of transaction request against said AR/RR, using said access file;

f) if said AR is acceptable for said transaction, granting said request; and if said CR is not acceptable for said transaction, entering at least one exception routine for additional authentication.

2. A method according to claim 1, said Step f) further comprising a step of entering at least one exception condition for additional acceptance testing as previously defined by the account user.

3. A method according to claim 1, wherein said step f) of entering at least one exception routine comprises at least one of the following steps:

a) evaluating a predetermined set of exception rules to supplement authentication;

b) requesting additional information from said requester to supplement authentication;

c) requesting a third party to intervene to supplement authentication.

4. A method according to claim 2, wherein said step f) of entering at least one exception routine comprises at least one of the following steps:

a) evaluating a predetermined set of exception rules to supplement authentication;

b) requesting additional information from said requester to supplement authentication;

c) requesting a third party to intervene to supplement authentication.

5. A personal identification system for facilitating secured-data transactions, comprising:

input means for receiving a transactions request from a requester, said transaction request being accompanied by said requester's fingerprints being generated from a fingerprint recognition system for recognizing said requester's fingerprints to generate said requester's fingerprint data in a predetermined format;

libraries and master files for storing a plurality of fingerprint data in connection with a plurality of account holders, said master files also registering a plurality of security levels required for a plurality of transactions as initially specified for each account holder;

data processing means coupled to said libraries master files and said input means for comparing said requester's fingerprint data with an entry in said master files corresponding to said account, said data processing means generating a comparison ratio ("CR") based on predefined comparison criteria;

request evaluation means coupled to said master files for determining whether said CR meets predefined security criteria required for said transaction request and if so, granting said request after successfully passes at least one predefined exceptions test;

exception processing means coupled to said request evaluation means for generating a predefined acceptance rules, if said CR does not meet said predefined security criteria, for additional authentication, said exception processing means also generating a predefined set of rejection rules if said CR does not meet said predefined security level for additional authentication.

6. A system according to claim 5, wherein said exception processing means further comprises at least one of the following:

means for alerting an offsite party for intervention;

means for alerting an onsite party for intervention;

means for requesting said user to submit additional information to supplement authentication;

means for said institution to establish customized automated exception rules and procedures to supplement authentication.

7. A system according to claim 6, further comprising:

user define means coupled to said input means and data processing means for defining a plurality of predefined processing functions when a request is not granted.

8. A program storage device readable by a machine, tangibly embodying a program of instructions executable by the machine to perform method steps for implementing a personal identification system for conducting secured transactions between a front end and a back end, the front end comprising a fingerprint recognition unit for reading an user's fingerprints to generate fingerprint data in a predetermined format and an input unit for receiving the user's fingerprint data and transaction requests for an account maintained at the back end, the account being initially set up with the user's fingerprint data, the back end comprising a data storage and processing unit for maintaining said account and comparing the fingerprint data from the front end with fingerprint data of said account identified by the transaction requests, the back end generating a comparison ratio ("CR") by comparing the fingerprint data received by the front end and the fingerprint data associated with the account, the method steps comprising:

a) establishing a multi-level access file for the account, the access file indicating a plurality of security criteria required for a plurality of allowable transactions;

b) providing at least one level of at least one exception processing to the multi-level access file, the exception processing being invokable when said CR is below what is required for an allowable transaction, the exception processing generating a plurality of user-defined functions and activities when invoked;

c) storing the multi-level access file and the exception processing at the back end such that the access file and the exception processing may be invoked when the back end receives a transaction request and an user's fingerprint data from the front end.

9. The computer program according to claim 8, wherein the exception processing comprises at least one of the following steps:

a) requesting the user for additional information to supplement authentication;

b) notifying a local third party to intervene;

c) notifying a remote third party to intervene.

10. The computer program according to claim 5, wherein said exception processing means also generates additional predetermined acceptance rules, if the CR meets said predetermined security, wherein said additional predetermined acceptance rules requires the account holder to provide additional verification.

* * * * *